(12) United States Patent
Musiala, Jr. et al.

(10) Patent No.: US 11,875,330 B2
(45) Date of Patent: Jan. 16, 2024

(54) SYSTEMS AND METHODS FOR A MICROPAYMENT SOLUTION FOR MEDIA APPLICATIONS

(71) Applicant: PennyPay, Inc., Evanston, IL (US)

(72) Inventors: Robert A. Musiala, Jr., Evanston, IL (US); John H. Kuk, Bloomington, IL (US)

(73) Assignee: PENNYPAY, INC., Evanston, IL (US)

( * ) Notice: Subject to any disclaimer, the term of this patent is extended or adjusted under 35 U.S.C. 154(b) by 0 days.

(21) Appl. No.: 16/665,584

(22) Filed: Oct. 28, 2019

(65) Prior Publication Data
US 2020/0134595 A1 Apr. 30, 2020

Related U.S. Application Data

(60) Provisional application No. 62/751,643, filed on Oct. 28, 2018.

(51) Int. Cl.
*G06Q 20/22* (2012.01)
*G06Q 20/06* (2012.01)
*G06Q 20/10* (2012.01)
*G06Q 20/36* (2012.01)

(52) U.S. Cl.
CPC ............ *G06Q 20/29* (2013.01); *G06Q 20/06* (2013.01); *G06Q 20/10* (2013.01); *G06Q 20/36* (2013.01)

(58) Field of Classification Search
CPC ........ G06Q 20/29; G06Q 20/06; G06Q 20/10; G06Q 20/36
See application file for complete search history.

(56) References Cited

U.S. PATENT DOCUMENTS

| | | | |
|---|---|---|---|
| 9,195,984 B1 | 11/2015 | Spector et al. | |
| 10,713,731 B2* | 7/2020 | Karame | G06Q 20/02 |
| 10,863,243 B2* | 12/2020 | Kiyooka | H04N 21/2407 |
| 11,188,897 B2* | 11/2021 | Kurian | G06Q 20/382 |
| 2010/0325048 A1 | 12/2010 | Carlson et al. | |
| 2013/0159172 A1 | 6/2013 | Kim | |
| 2014/0058938 A1 | 2/2014 | McClung, III | |
| 2015/0161589 A1 | 6/2015 | Snider | |

(Continued)

OTHER PUBLICATIONS

Decker, "Eltoo: A Simple Layer2 Protocol for Bitcoin," 2018 (Year: 2018).*

(Continued)

*Primary Examiner* — Scott S Trotter
*Assistant Examiner* — William D Newlon
(74) *Attorney, Agent, or Firm* — SMITH, GAMBRELL & RUSSELL; Michael J. Riesen; Indhira LaPuma

(57) ABSTRACT

The present disclosure relates generally to systems and methods for facilitating micropayments between distributed, independent consumers and content creators. A computer-implemented method is disclosed related to enabling tips between at least one content consumer and at least one content creator, comprising: receiving, at a web application from a user interface, an intent to tip; sending, via the web application, a payment initiation based on the intent to tip to a processing service; generating, at the processing service, a payment event based on the payment initiation, wherein the payment event comprises payment data; and updating, at the processing service, at least one wallet based on the payment data.

11 Claims, 12 Drawing Sheets

(56) References Cited

U.S. PATENT DOCUMENTS

| | | | | |
|---|---|---|---|---|
| 2015/0193802 A1* | 7/2015 | Tenison | ................. | G06Q 20/24 |
| | | | | 705/14.17 |
| 2015/0262138 A1* | 9/2015 | Hudon | ............... | G06Q 20/0658 |
| | | | | 705/39 |
| 2016/0042339 A1* | 2/2016 | Nichols | ................. | G06Q 20/12 |
| | | | | 705/35 |
| 2016/0335628 A1 | 11/2016 | Weigold | | |
| 2017/0243216 A1* | 8/2017 | Kohn | .................... | H04L 9/3236 |
| 2018/0075453 A1* | 3/2018 | Durvasula | .......... | G06Q 20/3678 |
| 2018/0121972 A1* | 5/2018 | DiMascio | .............. | G06Q 30/04 |
| 2019/0188724 A1* | 6/2019 | Fitch | ................ | G06Q 20/40145 |
| 2019/0220836 A1* | 7/2019 | Caldwell | .......... | G06Q 20/38215 |
| 2019/0290965 A1* | 9/2019 | Oren | ...................... | G16H 20/30 |
| 2019/0362340 A1* | 11/2019 | Strong | ............... | G06Q 20/3674 |
| 2019/0378153 A1* | 12/2019 | Eich | ..................... | G06Q 20/367 |
| 2020/0322685 A1* | 10/2020 | Kiyooka | ............. | H04N 21/266 |
| 2023/0017855 A1* | 1/2023 | Kikinis | ............. | G06Q 20/3827 |

OTHER PUBLICATIONS

PCT Searching Authority, International Search Report for PCT/US/2019/058320 (counterpart to the present application), dated Jan. 2, 2020.

PCT Searching Authority, Written Opinion of the International Searching Authority for PCT/US/2019/058320 (counterpart to the present application), dated Jan. 2, 2020.

\* cited by examiner

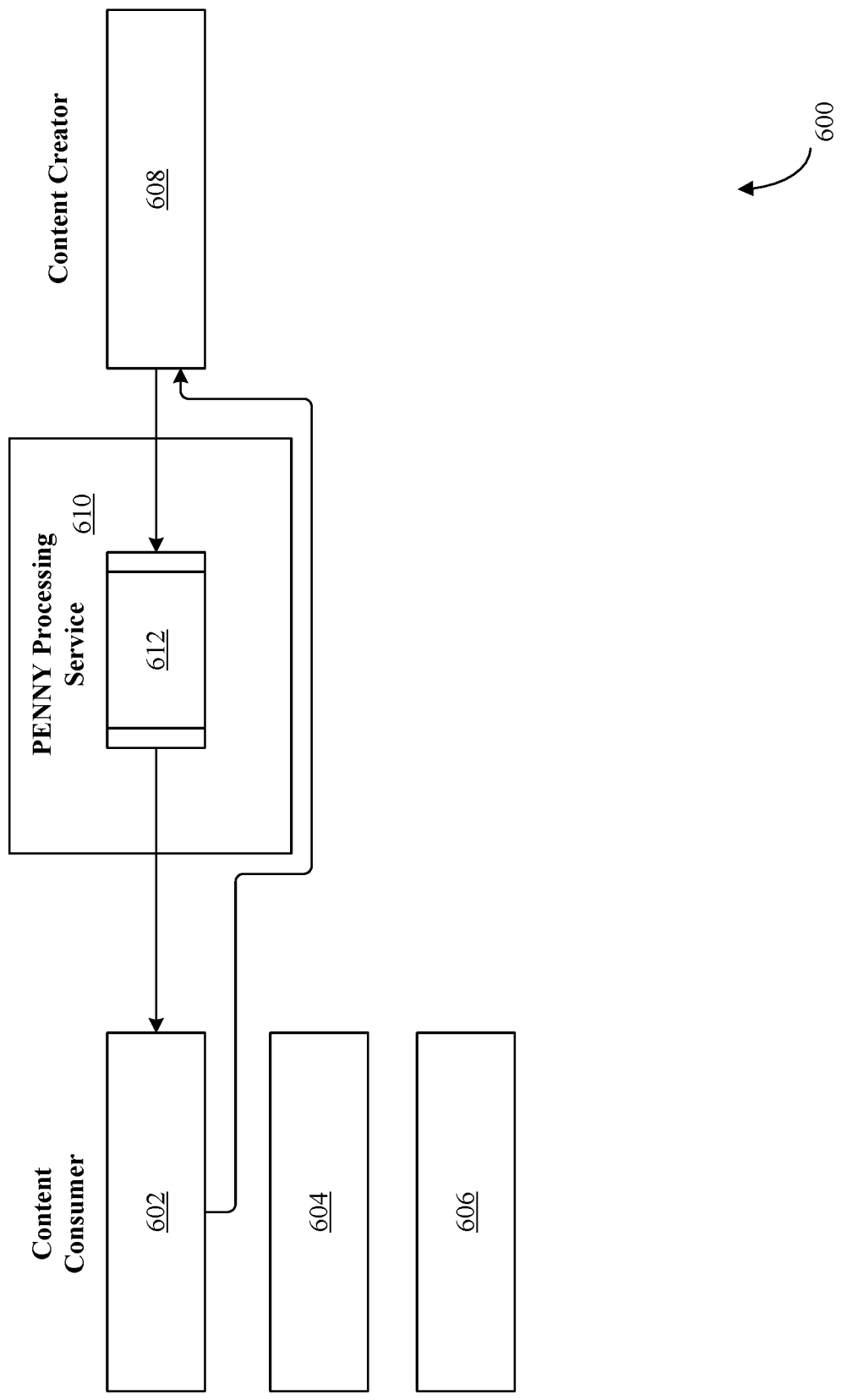

SYSTEMS AND METHODS FOR A MICROPAYMENT SOLUTION FOR MEDIA APPLICATIONS

REFERENCE TO PRIOR APPLICATION

This application claims the benefit of U.S. Provisional Application Ser. No. 62/751,643 entitled "PENNY MICROPAYMENTS SOLUTION FOR INTERNET MEDIA APPLICATIONS" and filed on Oct. 28, 2018, which is incorporated herein by reference in its entirety.

TECHNICAL FIELD

The present disclosure relates generally to systems and methods for facilitating micropayments between distributed, independent consumers and content creators.

BACKGROUND

The widespread proliferation and adoption of Internet and mobile device access across the world has enabled countless benefits to individuals, businesses and national economies arising from the ability to send and receive funds through Internet applications. However, the cost of processing these payments through traditional banking infrastructure limits an entire category of payments, often termed "micropayments." Credit card processing fees of about $3.00 per transaction make it commercially impracticable for businesses to accept and build business models around accepting internet payments valued under about $5.00.

Cryptocurrencies have attempted to solve this problem by leveraging the unique characteristics of blockchain technology. However, even the most robust cryptocurrency networks, like Bitcoin and Ethereum, have thus far failed to enable timely, cost effective micropayments adaptable on a large scale.

The limitations of current Internet based payment technology have prevented global markets from accessing the significant prosperity that would be accessible if micropayments of as little—or even less than—a single penny could be accomplished over the internet on a broad scale that is commercially attractive and economically viable from a business perspective.

SUMMARY

In one embodiment, a computer-implemented method is disclosed related to enabling tips between at least one content consumer and at least one content creator. The method may include at least the following steps receiving, at a web application from a user interface, an intent to tip; sending, via the web application, a payment initiation based on the intent to tip to a processing service; generating, at the processing service, a payment event based on the payment initiation, wherein the payment event comprises payment data; and updating, at the processing service, at least one wallet based on the payment data. The method may include additional, less, or alternate functionality, including that discussed elsewhere herein.

In another embodiment, a tangible machine-readable medium comprising instructions for enabling tips between at least one content consumer and at least one content creator is disclosed. The instructions when executed, may cause a machine to at least: receive an intent to tip; send a payment initiation based on the intent to tip to a processing service; generate a payment event based on the payment initiation, wherein the payment event comprises payment data; and update at least one wallet based on the payment data. The instructions may include additional, less, or alternate functionality, including that discussed elsewhere herein.

In yet another embodiment, a system for enabling tips between at least one content consumer and at least one content creator is disclosed. The system may comprise a web application; a user interface; a processing service; and the system may be configured to at least: receive, at the web application from the user interface, an intent to tip; send, via the web application, a payment initiation based on the intent to tip to the processing service; generate, at the processing service, a payment event based on the payment initiation, wherein the payment event comprises payment data; and update, at the processing service, at least one wallet based on the payment data. The system may include additional, less, or alternate functionality, including that discussed elsewhere herein.

Advantages will become more apparent to those of ordinary skill in the art from the following description of the preferred aspects, which have been shown and described by way of illustration. As will be realized, the present embodiments may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various embodiments, features, and aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 6 depicts an exemplary process for facilitating direct payment between independent consumers and content creators.

Figure 1:
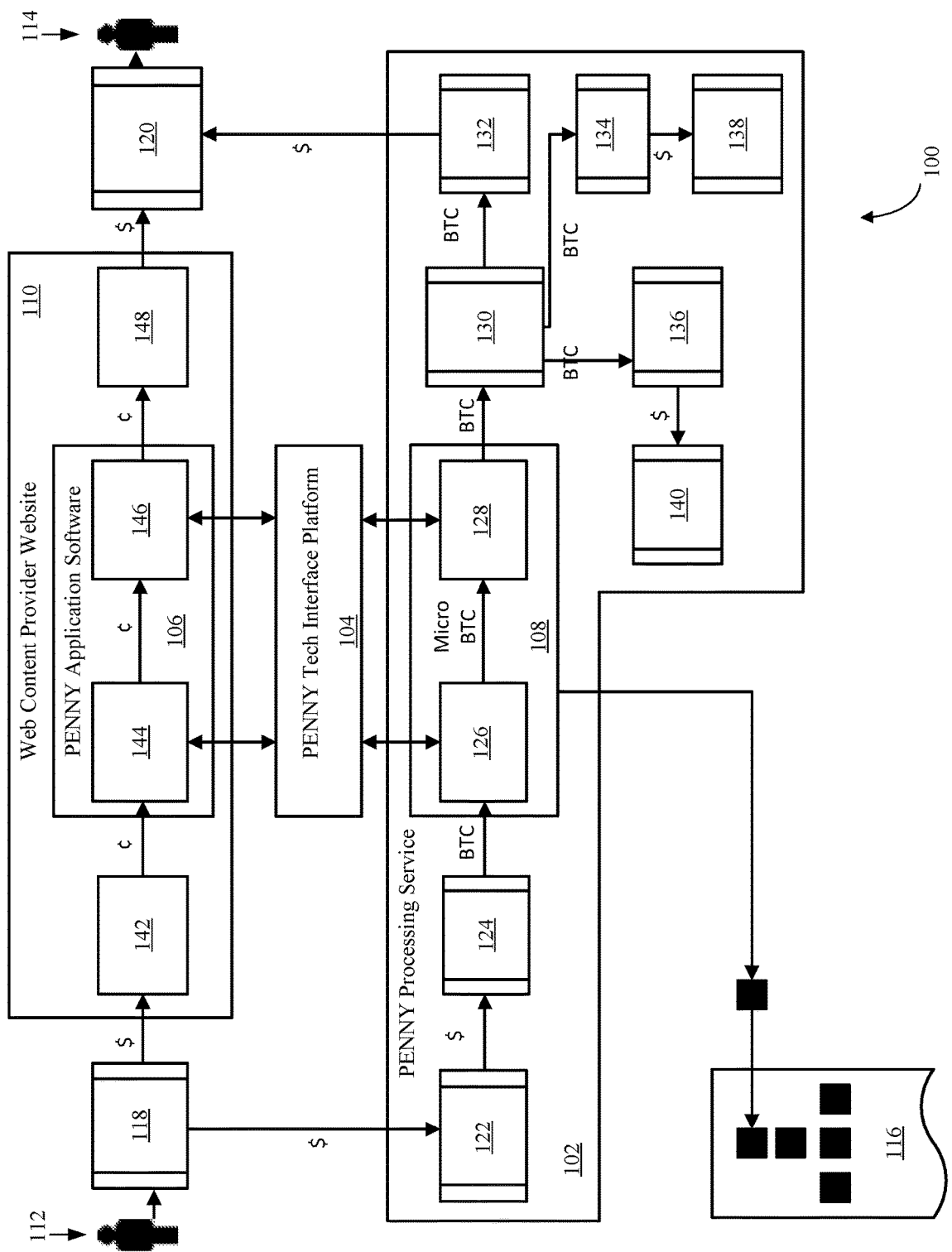
FIG. 1 depicts an exemplary system architecture for facilitating micropayments between distributed, independent consumers and content creators.

The figures depict aspects of the present embodiments for purposes of illustration only. One skilled in the art will readily recognize from the following discussion that alternate aspects of the structures and methods illustrated herein may be employed without departing from the principles of the disclosure described herein.

DETAILED DESCRIPTION

The present disclosure relates generally to systems and methods for facilitating micropayments between distributed, independent consumers and content creators. An exemplary computer-implemented method is disclosed related to enabling tips between at least one content consumer and at least one content creator, comprising: receiving, at a web application from a user interface, an intent to tip; sending, via the web application, a payment initiation based on the intent to tip to a processing service; generating, at the processing service, a payment event based on the payment initiation, wherein the payment event comprises payment data; and updating, at the processing service, at least one wallet based on the payment data. More specifically, in some embodiments the present disclosure relates to systems and processes for facilitating micropayments of as little as one U.S. cent between distributed, independent consumers and content creators.

These independent consumers and content creator may be connected through media hosted on a third party website, and the present disclosure presents systems and methods to facilitate the cost effective movement of funds from the content consumers to the content creators, as well as website hosts, and the system administrator, through the integration of website media applications, traditional payment methods, and new payment systems.

In some embodiments, these new payment systems may be digital currency systems, and the present disclosure may leverage so called "layer two solutions" for those systems, such as, for example, utilizing the Bitcoin Network and the Bitcoin Lightning Network to facilitate micropayments between distributed, independent consumers and content creators.

A variety of potential use cases for this technology are disclosed herein. Potential embodiments and their benefits are listed below. The example embodiments are not meant to be limiting. The use cases described herein may make use of the particular components depicted in all the figures. In some cases, additional components and actors not depicted in the figures may be part of enabling the disclosed use cases.

One exemplary embodiment of the systems and methods described herein is the PENNY Micropayments Solution. The PENNY Micropayments Solution is a computer implemented system that acts as the interface between the Bitcoin Lightning Network, bitcoin exchanges, traditional banks, commercial websites, and internet consumers and content creators. By leveraging the inherent advantages of the Bitcoin Lightning Network as a payment system, and by creating a seamless and user-friendly experience for website hosts, consumers, and content creators, the PENNY Micropayments Solution enables cost effective micropayments to be made between website consumers and content creators through the familiar medium of clicking a button on a website. By eliminating the need for website hosts, consumers and content creators to interact with bitcoin or the Bitcoin Lightning Network, the PENNY Micropayments Solution brings the power of micropayments to everyday Internet usage and unlocks the value inherent in enabling Internet-based payments in amounts as low as one cent.

According to one aspect and example provided herein a computer implemented governance system is provided. In one example, the system uses a blockchain and related second-layer blockchain protocol to enable and facilitate cost effective micropayments from Internet content consumers to content creators, website hosts, and the system administrator, in a manner such that user actions required to utilize the system need not extend beyond familiar actions commonly used to engage Internet media, online credit card payments, and electronic banking.

In one aspect, proprietary application software is provided that enables website hosts to access and implement the micropayments system, which may be referred to as the PENNY system. As one example, after PENNY software integration, website content consumers will have an option to fund PENNY tipping accounts accessible through their website user accounts. PENNY software integration also will enable a tipping "button" visible near website content, similar to the "like" buttons on various popular websites like Facebook, LinkedIn, Instagram, Twitter, and others.

According to one aspect, website consumers wishing to use the PENNY tipping function first fund their PENNY accounts via online credit card payment. Consumers then select a custom/default "tip" amount (e.g., an amount from $0.01-$3.00). When a consumer views appealing content, the consumer sends their selected tip amount to the content creator by clicking the "tip" button visible beneath the content.

One aspect of the disclosure includes a proprietary PENNY Technology Interface Platform ("PTIP") that manages the receipt of USD from credit card transactions used to fund consumer PENNY accounts and converts the USD to bitcoin (or other cryptocurrency) held in a bitcoin wallet administered by the PTIP for the consumer. The PTIP may further transfer bitcoin administered on behalf of a website content consumer to a wallet held on behalf of the consumer within a Bitcoin Lightning Network Channel (or similar second layer blockchain protocol). These payment channels administered by the PTIP may be referred to as PENNY Bitcoin Lightning Network Channels ("PBLNCs").

In one example, conversion of USD to bitcoin, and hosting of bitcoin wallets and Bitcoin Lightning Network channels, is accomplished through PTIP integration with an institutional bitcoin exchange (e.g., Coinbase, Kraken, Gemini, bitFlyer).

In some examples, each website content creator registered with PENNY will have a corresponding bitcoin account administered by PENNY that will be used as a clearing account for bitcoin received by the creator. Each website content creator registered with PENNY will also have one PENNY Bitcoin Lightning Network Channel ("PBLNC") for each website where the creator is registered to receive PENNY "tips." Each PBLNC will contain a PBLNC wallet for the creator to receive Lightning Network payments from consumers. Each content creator's PBLNC will also contain a unique wallet for each consumer registered to send PENNY "tips" to the creator through a particular website.

In one aspect of the disclosure, the PBLNC wallets for both consumers and creators are linked to the consumer and creator online PENNY accounts through the PENNY proprietary tech interface platform ("PTIP"). As an example, this enables bitcoin to be sent from a consumer's PBLNC wallet to a content creator's PBLNC wallet when the consumer clicks the "tip" button beneath the content creator's content viewed on a website. When a consumer sends a "tip" through the website, the tech interface platform ("PTIP") sends bitcoin in the amount of the "tip" from the consumer PBLNC wallet to the creator receiving wallet within the same PBLNC.

According to one aspect, on a periodic basis (e.g., monthly or bi-monthly) the PTIP clears and settles the transactions in the PBLNCs hosted for each creator onboarded to the PENNY system. By clearing/settling the PBLNCs, the sum of bitcoins sent from website consumers to website content creators during the period will be sent to each creator's PENNY administered bitcoin wallet outside the PBLNCs. At the time the channel is cleared/settled, the total amount of bitcoin sent to the creator's bitcoin clearing account wallet, and any amounts sent back to consumer receiving bitcoin wallets, will be broadcast and verified on the bitcoin blockchain as a traditional bitcoin transaction.

In one example, from a creator's bitcoin clearing account wallet, the total bitcoin received in every periodic PBLNC closing transaction is then separated and sent to two or more unique bitcoin wallets. These additional bitcoin wallets are used to segregate contractually agreed upon amounts earned by content creators, the website host, PENNY, and other stakeholders. For example, applicable contract terms may provide that funds from every channel closing period are distributed 80 percent to the content creator, 10 percent to the website host, and 10 percent to PENNY In some examples, once bitcoin funds are segregated into stakeholder bitcoin wallets, PENNY's bitcoin exchange partner then converts the amounts in each stakeholder bitcoin wallet into USD and deposits the USD into the stakeholder's bank account via an ACH transaction. The PBLNC clearing/settlement process can be automated using smart contracts or other predefined procedures implemented through the PENNY partner bitcoin exchange. Web content creators, PENNY, website hosts, and other stakeholders will receive USD transferred by the bitcoin exchange partner via lump sum ACH payments at the end of each PBLNC closing period.

The exemplary system may track and perform data analysis on "tips" sent and received through the system. For example, as "tips" are sent from website consumers to website content creators, PENNY application software collects data on amounts sent and received. PENNY application software organizes, analyzes, and displays this data for the benefit of website owners that have integrated PENNY micropayments into their website.

The exemplary system may provide a net benefit to all parties involved in the system. Processing fees associated with traditional Internet based payment methods are cost prohibitive to effective Internet based micropayment systems. By enabling cost effective micropayments of as little as one penny, the PENNY system may provide benefits to Internet content consumers, content creators, and website hosts.

In one example, website consumers gain a means of providing a small but meaningful monetary reward to express their appreciation and provide monetary support to content creators. A PENNY micropayment "tip" is as easy as clicking a "like" button and is equivalent to giving a tiny donation—as little as one cent—to the creators of content that the consumer "likes."

In another example, creators of website content gain a new source of revenue to encourage and support their work. The following are some examples of websites and their ecosystems that would benefit from integration of the PENNY Micropayments Solution: social media (e.g., Facebook, LinkedIn, Twitter, Instagram), journalism (e.g., New York Times, Wall Street Journal, Washington Post), travel/leisure (e.g., TripAdvisor, Yelp), arts/academia (e.g., Wikipedia, universities, museums, non-profits), crowdfunding, music (e.g., Pandora, Spotify, SoundCloud, TuneIn, Bandcamp), video (e.g., YouTube, Snapchat, TikTok), and podcasts. These examples and other media creators gain access to a new "crowdfunding" mechanism that is part and parcel of the website outlets used to publish their media.

In a further example, website hosts gain a new consumer experience, a percentage of micropayments sent through their website, and valuable data analytics, such as which consumers give the most "tips" and which content creators receive the most "tips." The additional funds and additional consumer data can be used to enhance and optimize the content provided by the website. New consumer incentive programs can be created based on "tipping" behavior.

The figures described herein include a variety of components, and a proposed system architecture that may enable the use cases described herein. In some cases, alternate system approaches may be possible including, but not limited to, more or fewer elements in a system, or additional functionality. In particular, the processes described above, and below, with respect to creating the PENNY Micropayment Solution may make use of the system architecture, components, services, and processes, depicted in the figures. In particular, the functionality depicted in the figures may be realized via a downloadable mobile application that a user can interact with, or other software programs that may be referred to herein as PENNY, or other variants of PENNY. The APIs, and services described with respect to FIGS. 1-10 may be linked to each other and the components disclosed therein in a way to effectuate the use cases described in this disclosure.

FIG. 1 depicts an exemplary system architecture 100 for facilitating micropayments between distributed, independent consumers and content creators. FIG. 1 includes a PENNY processing service 102, a PENNY Tech Interface Platform 104, a PENNY Application Software 106, a Lightning Network channel 108, a Web Content Provider Website 110, an independent consumer 112, a content creator 114, a blockchain ledger 116 (e.g. the Bitcoin Blockchain), a Consumer Credit Card Payment Processor 118, a Content Creator Bank Account 120, a PENNY Bank Account (receiving) 122, a PENNY Bitcoin Exchange Account (receiving) 124, a PENNY Consumer Wallet 126, a PENNY Web Content Creator Wallet 128, a PENNY Bitcoin Exchange Clearing Account 130, a PENNY Bitcoin Exchange Escrow Account (Creator) 132, a PENNY Bitcoin Exchange Revenue Account 134, a PENNY Bitcoin Exchange Escrow Account (Web Host) 136, a PENNY Bank Account 138, a Web Content Provider Bank Account 140, a Consumer Website Account 142, a PENNY Consumer Account 144, a PENNY Content Creator Account 146, and a Creator Website Account 148.

In FIG. 1, the depicted components facilitate a seamless user experience that allows an independent consumer 112 to provide fiat currency to a system for tipping, for example by using a credit card at a website or through a downloadable mobile application that can then be used as part of tipping in a cryptocurrency to a content creator 114.

The PENNY tech platform interfaces Consumer/Creator website PENNY accounts with corresponding wallets in Bitcoin Lightning Network channel. PENNY Bitcoin Lightning Network Channel (Web Content Provider may have One Channel per Content Creator). PENNY Bitcoin Lightening Network Channel clears BTC in periodic (e.g., bimonthly) transactions broadcast and may be verified on a blockchain ledger 116, such as the Bitcoin blockchain. PENNY registered content creators receive periodic (e.g., bi-monthly) deposits into their personal bank account for PENNY tips received.

Figure 2:
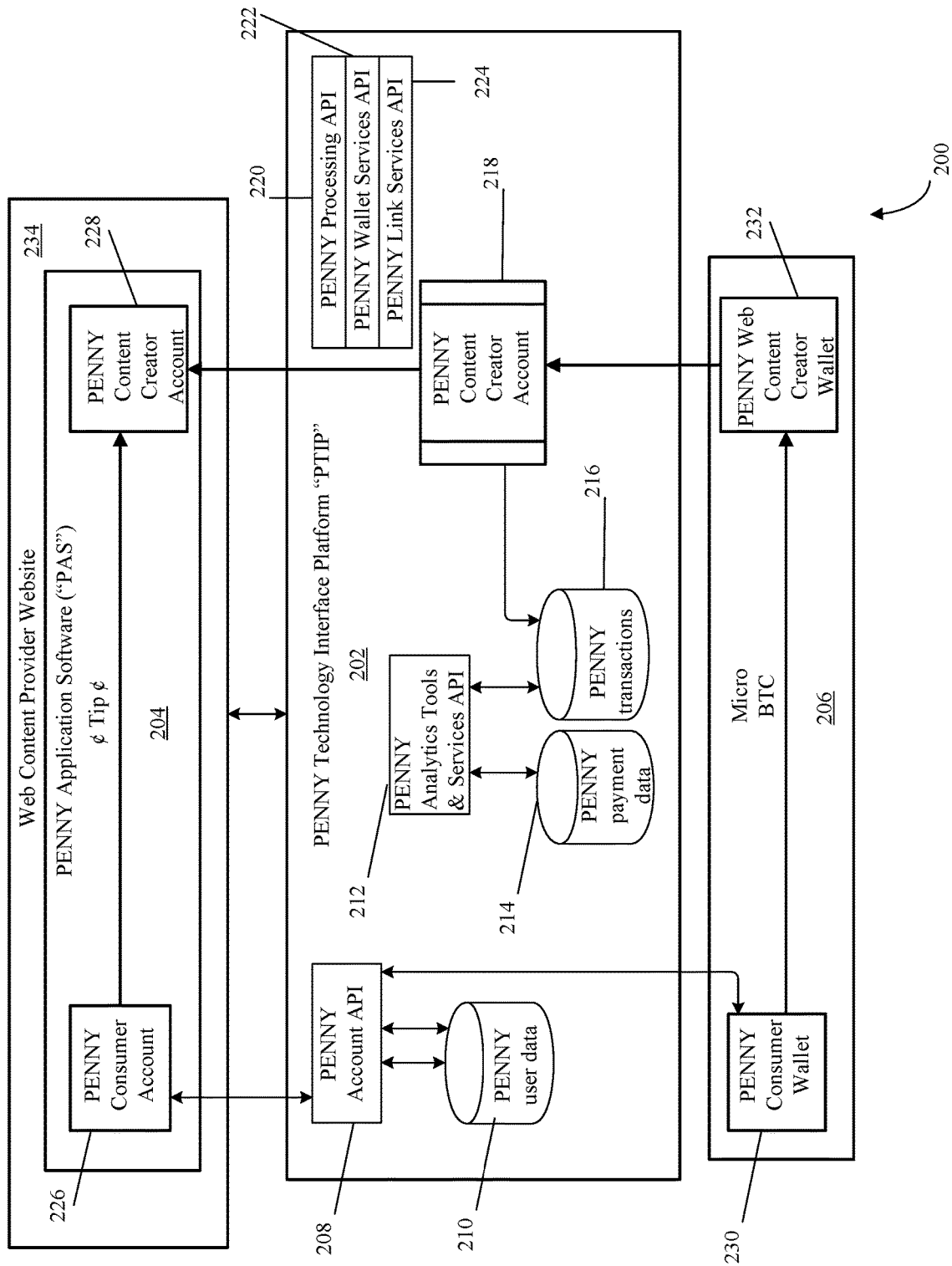
FIG. 2 depicts exemplary components for a system for facilitating micropayments between distributed, independent consumers and content creators.

FIG. 2 depicts exemplary components for a system 200 for facilitating micropayments between distributed, independent consumers and content creators. FIG. 2 includes a PENNY Technology Interface Platform "PTIP" 202, a PENNY Application Software ("PAS") 204, a Lightning Network channel 206, a PENNY Account API 208, a PENNY user data database 210, a PENNY Analytics Tools & Services API 212, a PENNY payment data database 214, a PENNY transactions database 216, a PENNY content creator account 218, a PENNY Processing API 220, a PENNY Wallet Services API 222, a PENNY Link Services API 224, a PENNY Consumer Account 226, a PENNY Content Creator Account 228, a PENNY Consumer Wallet 230, a PENNY Web Content Creator Wallet 232, and a Web Content Provider Website 234.

An example flow involving the components depicted in FIG. 2 may be as follows. A consumer clicks a "tip" button via a website, PAS sends payment initiation to PTIP. PTIP triggers payment via consumer PBLNC wallet. PTIP sends payment confirmation to PAS, payment is displayed in consumer PAS account. PTIP receives payment confirmation via consumer PBLNC wallet. A Data Analytics Tool collects payment data and sends to external dashboard for display to website host. PTIP receives confirmation of payment receipt via creator PBLNC wallet, forwards payment info to PAS for display in creator wallet.

The PENNY Application Software (PAS) may primarily contain the code and framework to allow users (content creator and consumer) to interact with each other through web and mobile applications. It will have user account creation which will tie into back end service API's that will also generate PENNY wallets. The mobile application will have key interactions where invoice QR code and links can be generated and captured by the phone's camera or through touching to trigger the link for payment or to view the details of an invoice. Alternatively, the mobile application will allow the content creator to issue invoices to collect payment when tips have accumulated. If a user allows, native features of a mobile phone will be leveraged to gain analytic information that along with the tips and content created will provide market insights. Trends related to what kind of content generates tips and who and where tippers are located can be gathered.

The PENNY Technology Interface Platform (PTIP) will have key API's which comprise the framework code to perform account management, payment processing, wallet interactions, and link generation. There will also be API's that will tie into functionality used by web and mobile applications to perform data correlation at the blockchain ledger as well as analytic tools and services to determine data insights from system usage.

The PENNY Processing API will specifically coordinate invoice and payment aggregation between content consumers (tippers) and the PENNY wallet, and again between PENNY and content creator wallets. There will be Bitcoin Lightning Network channel creation and satoshi (micro-BTC) level transactions that will be added to the Bitcoin blockchain ledger. This is something that PENNY will be able to correlate end to end transactions for content creators.

Figure 3:
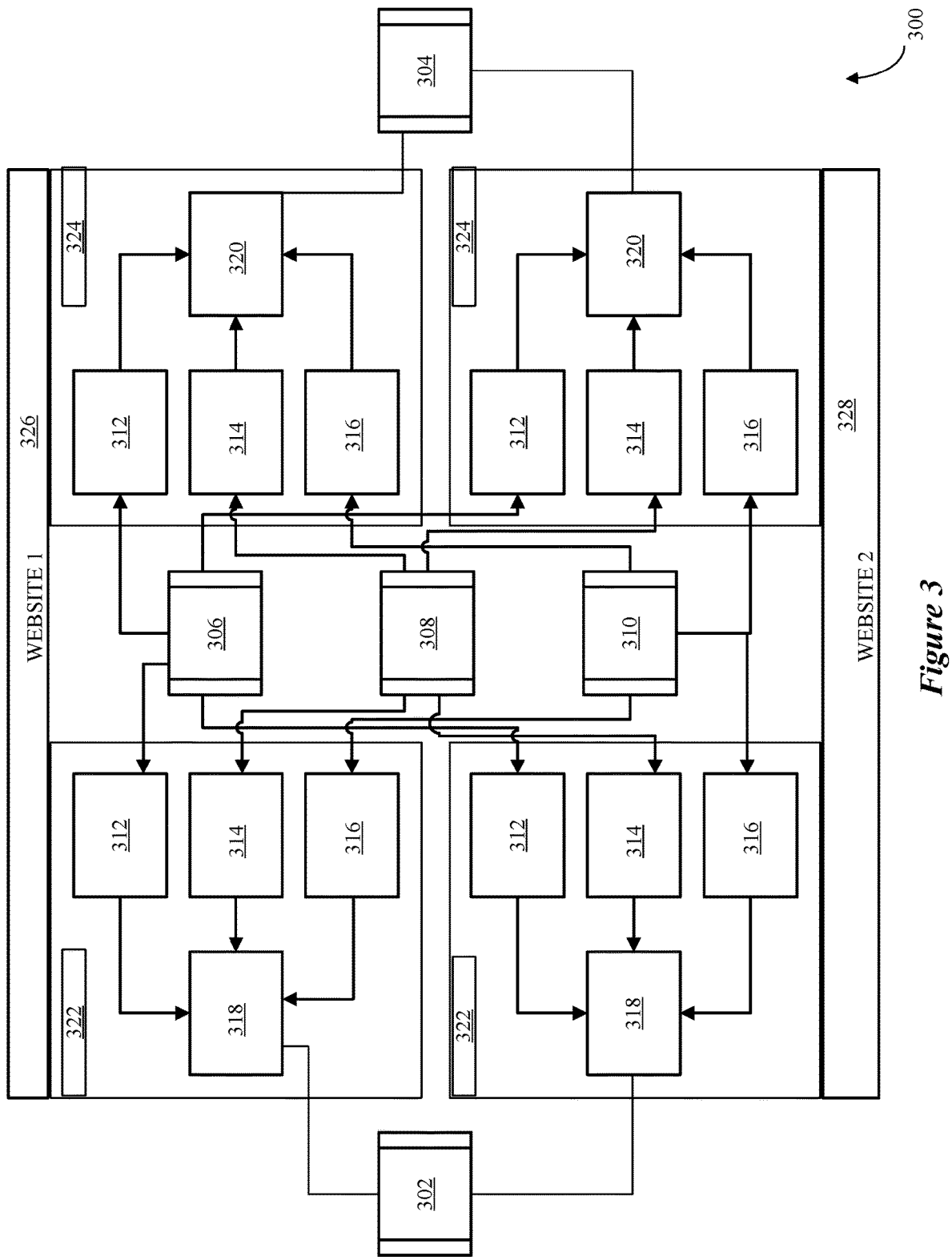
FIG. 3 depicts an exemplary system for facilitating micropayments between distributed, independent consumers and content creators.

FIG. 3 depicts an exemplary system 300 for facilitating micropayments between distributed, independent consumers and content creators. FIG. 3 includes a PENNY Bitcoin Exchange Clearing Account X 302, a PENNY Bitcoin Exchange Clearing Account Y 304, a PENNY Bitcoin Exchange Account (receiving) A 306, a PENNY Bitcoin Exchange Account (receiving) B 308, a PENNY Bitcoin Exchange Account (receiving) C 310, a PENNY Consumer Wallet A 312, a PENNY Consumer Wallet B 314, a PENNY Consumer Wallet C 316, a PENNY Web Content Creator Wallet X 318, a PENNY Web Content Creator Wallet Y 320, a PBLNC—Creator X 322, a PBLNC—Creator X 324, a First Content Website 326, and a Second Content Website 328.

PENNY Bitcoin Lightning Network Channels ("PBLNCs") are organized by website hosts and website content creators, with each website integrated with PENNY having one PBLNC per creator. When a website consumer sends a PENNY "tip" to a content creator for the first time, PENNY establishes a new PBLNC wallet for that consumer in the creator's PBLNC. In this example, Creator X and Creator Y each have PBLNCs through websites 1 and 2. Consumers A, B and C each send PENNY "tips" to Creators X and Y through both websites. Consumers A, B and C each have a one PENNY Bitcoin account and four PBLNC accounts. If Consumers A, B or C "tip" Creator X or Y through a third website, or if they "tip" a third creator through website 1 or 2, a new PBLNC wallet will be established for the Consumer within a new PBLNC.

PBLNCs are "cleared" periodically (e.g., bimonthly). Total BTC received by Creators via PBLNCs with various websites are deposited into Creator PENNY BTC accounts. After clearing to the Creator's PENNY bitcoin account, the BTC is exchanged for USD and transferred to the Creator's bank account.

Figure 4:
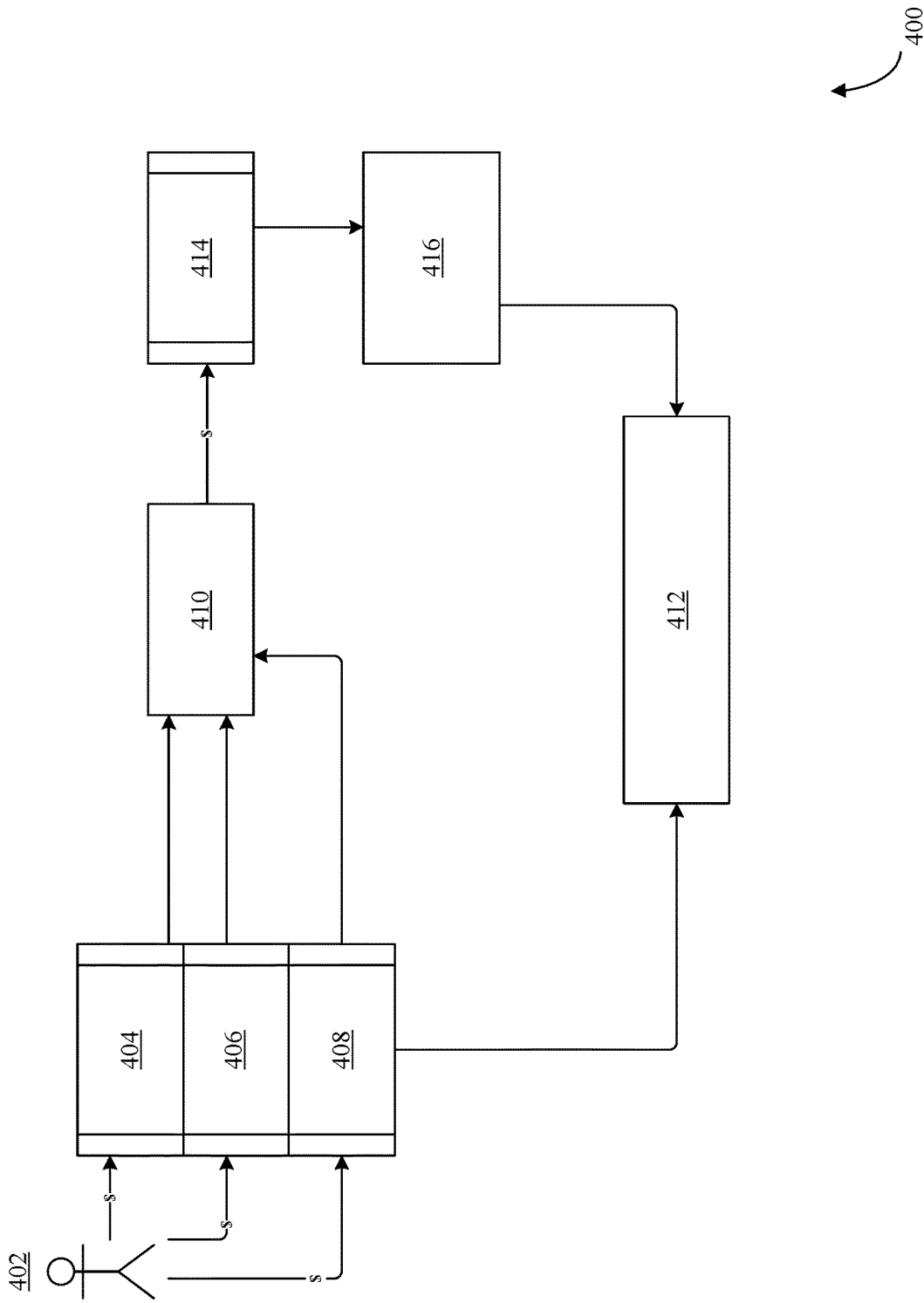
FIG. 4 depicts an exemplary service for funding a wallet for use in micropayments.

FIG. 4 depicts an exemplary service for funding a wallet for use in micropayments. FIG. 4 includes a content consumer 402, a Consumer Credit Card Payment Processor 404, a Bank Transfer Processor 406, an Other Payment Processor 408, a PENNY Bank Account (receiving) 410, a Lightning Network Wallet 412, a PENNY Processing Service 414, and a PENNY Bitcoin Exchange Account (receiving) 416. The content consumer 402 may fund the PENNY Bank Account with the three processors 404, 406, and 408, or may fund the Lightning Wallet 412 directly with the 408 processor. The PENNY Processing Service 414 may exchange dollars for BTC/satoshi that is ultimately used to fund the Lightning Wallet.

A content consumer may have options to provide payment into the system as a source for funds to use in the system for tipping or making micro-payments. This may be converted by the automated PENNY Processing Service to generate Lightning Network funds. These may be fractions of Bitcoin (BTC), and alternatively known as micro-BTC or satoshi. 1 satoshi is equivalent to 0.00000001 BTC. Third party processing may have various charges and fees. These may be subtracted from the consumer at the time of wallet funding. Depending on funding method this can be anywhere from $0 to 3% or more.

Figure 5A:
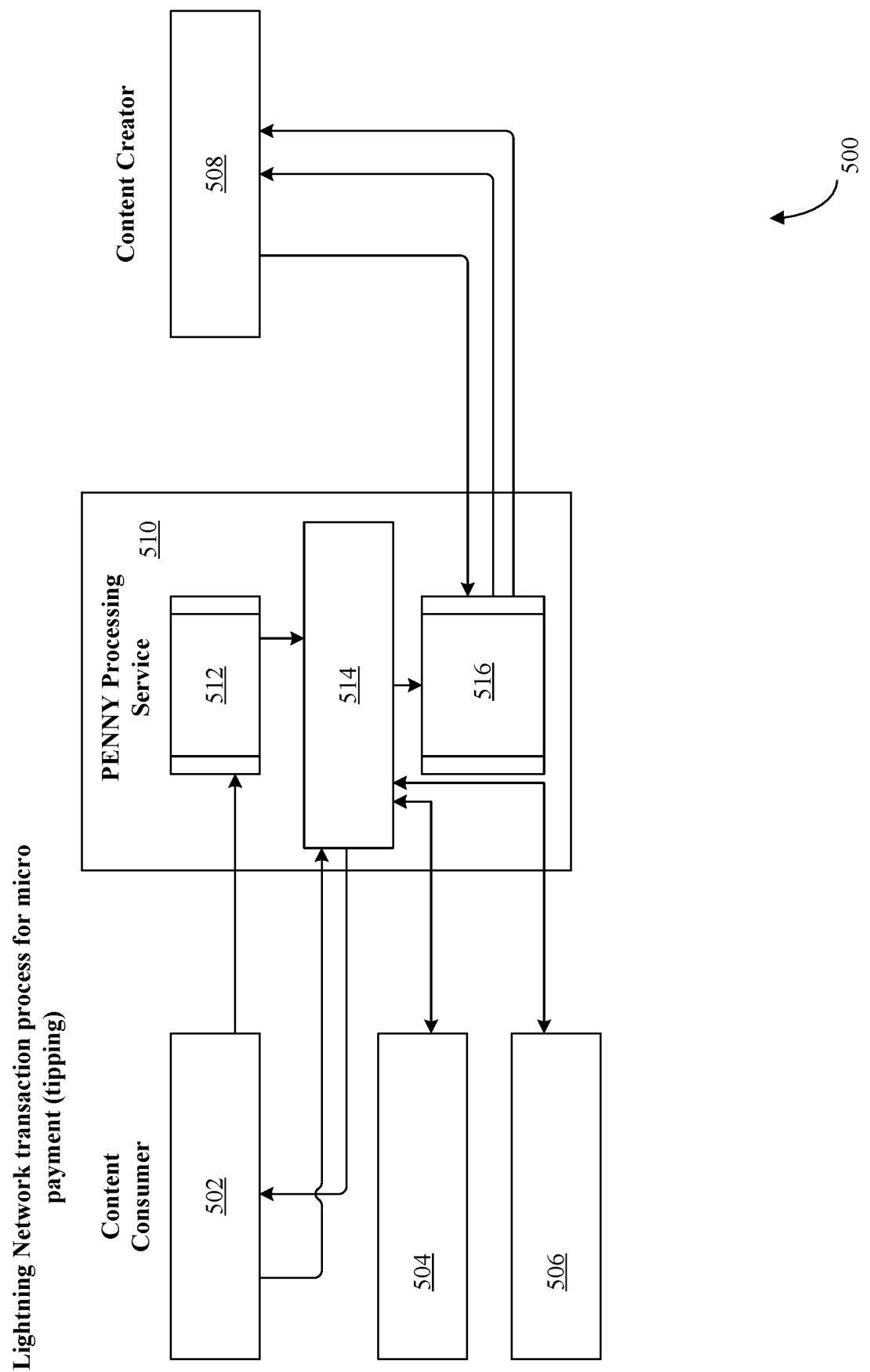
FIG. 5*a* depicts an exemplary process facilitating micropayments between distributed, independent consumers and content creators.

FIG. 5a depicts an exemplary process 500 facilitating micropayments between distributed, independent consumers and content creators. FIG. 5a includes a first content consumer wallet 502, a second content consumer wallet 504, a third content consumer wallet 506, a content creator wallet 508, a PENNY Processing Service 510, a Create Invoice function 512, a PENNYPAY Lightning Wallet 514, and a Consolidate and Distribute Payment function 516.

As depicted in FIG. 5a, because of the way Lightning transactions work, there may be custom components that will be needed to consolidate any funds from consumers 1, 2, and 3. Then these funds may be distributed to the content creator through an invoice link that the processing service will distribute to the content creator through a similar lightning network invoice and pay process.

Figure 5B:
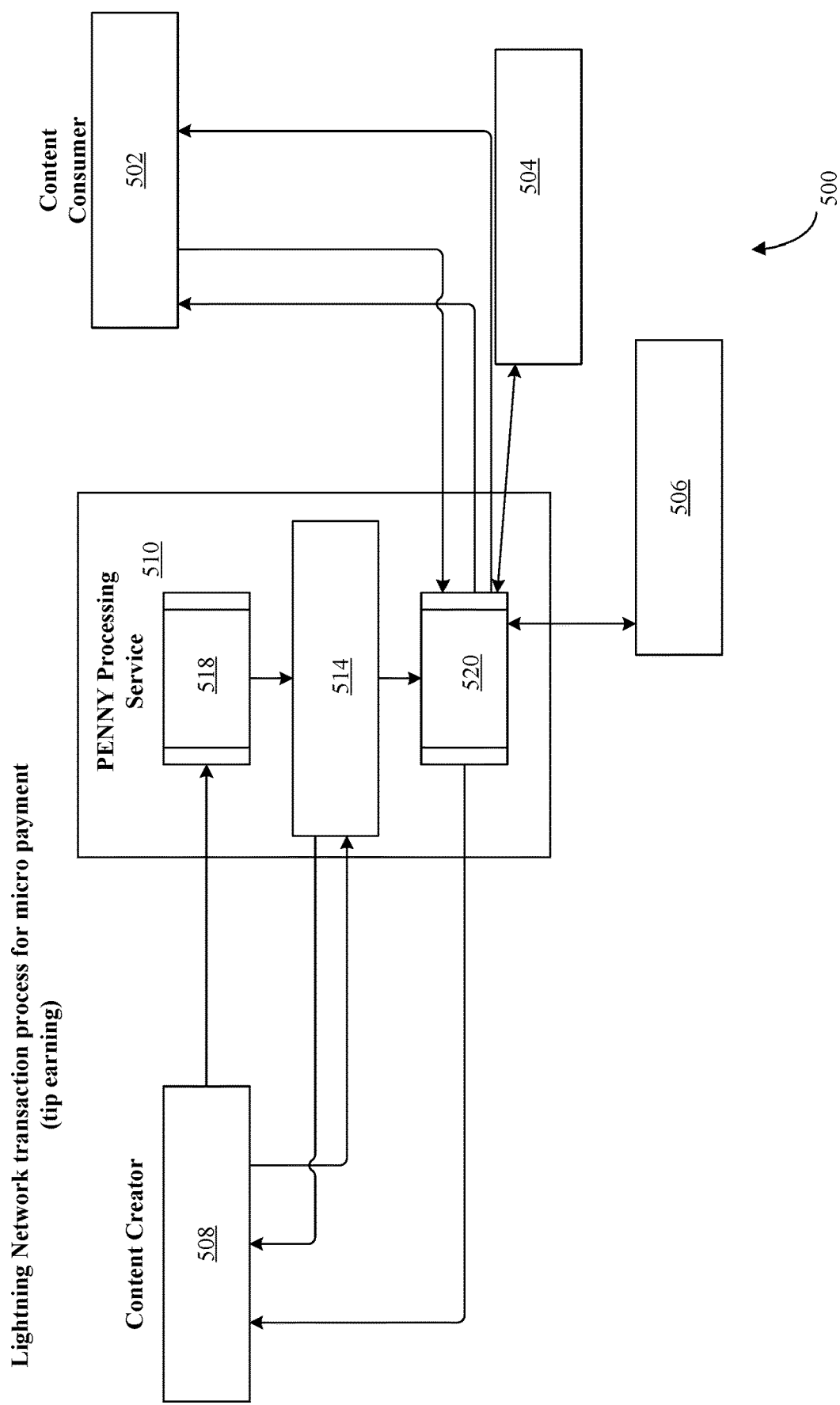
FIG. 5*b* depicts an exemplary process facilitating micropayments between distributed, independent consumers and content creators.

FIG. 5b depicts an exemplary process facilitating micropayments between distributed, independent consumers and content creators. FIG. 5b includes a first content consumer wallet 502, a second content consumer wallet 504, a third content consumer wallet 506, a content creator wallet 508, a PENNY Processing Service 510, a Promotion function 518, a PENNYPAY Lightning Wallet 514, and a Distributing and Reducing budget function 520.

As depicted in FIG. 5b, the transactions can work opposite from a tipping perspective. Where a budget is first created by the content creator for a promotion activity that the content consumer would earn a tip. For example, a content creator may decide to fund $10 for the next 10 individuals to take a survey or view some sort of video for a product. After submission of the survey or watching the advertisement the consumer has "earned" their tip. The PENNY system would then pay the agreed amount to the content consumer.

FIG. 6 depicts an exemplary process for facilitating direct payment between independent consumers and content creators. FIG. 6 includes a first content consumer wallet 602, a second content consumer wallet 604, a third content consumer wallet 606, a content creator wallet 608, a PENNY Processing Service 610, and a forward invoice function 612.

The way Lightning Network Transactions work, a channel is established between two parties. Then an invoice is created by one party and a QR code or link can be sent for the other to pay. The funds are passed between lightning network wallets, and then the channel is closed. In this scenario if there is a whole amount that the content creator wishes for a one time transaction (no tipping scenario), the invoice link is forwarded and there is a direct payment made to the invoice by the first consumer willing to pay the full amount.

Figure 7:
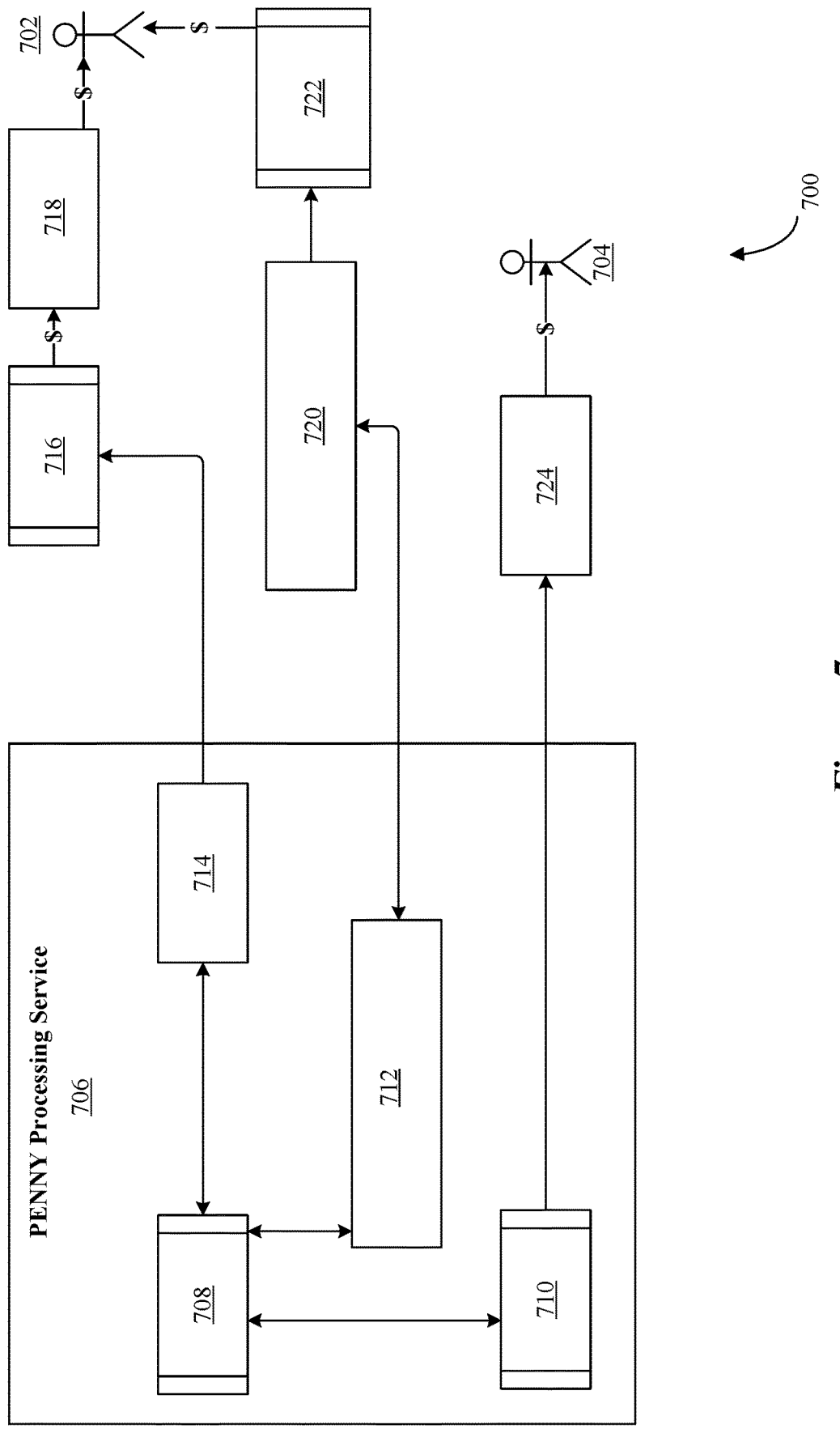
FIG. 7 depicts an exemplary process for distributing and claiming funds accrued via micropayments.

FIG. 7 depicts an exemplary process for distributing and claiming funds accrued via micropayments. FIG. 7 includes a content creator 702, a website provider 704, a PENNY Processing Service 706, a PENNY Processing Service 708 for exchanging BTC to USD and handling invoices, a PENNY distribution service 710, a PENNY Lightning Wallet 712, a PENNY Bank Account 714, a Bank Funds Transfer Processor 716, a Content Creator Bank Account 718, a content creator Lightning Wallet 720, a Third Party Processor 722, and a Web Provider Bank Account 724.

As depicted in FIG. 7, the depicted services may clear tipping funds and convert them from micro-BTC into dollars to transfer from bank account to bank account. Alternatively, the content creator may access their Lightning wallet directly and use a third party service to convert and extract funds.

Before funds are moved from wallet to wallet, the funds need to be settled between wallets. Either deducted from the creator to convert for them, or transferred from PennyPay's wallet into their wallet.

At various points there may be service fees deducted to pay for this automated processing and transferring of funds. These points will be from bank account to bank account or from the PENNY processing service of anywhere from 10-20% or more. There may be costs associated when clearing micro-BTC/satoshi into the Bitcoin Blockchain Ledger as well which are fairly small and only upon opening and closing a Lightning Channel.

A content creator may be asked by a web content provider for payment which may be a service of PennyPay to automate their service fee distributions on behalf of the content creator. The PENNY distribution service would handle automated transfer of funds between the PENNY Bank account to the Web Provider Bank Account.

Figure 8:
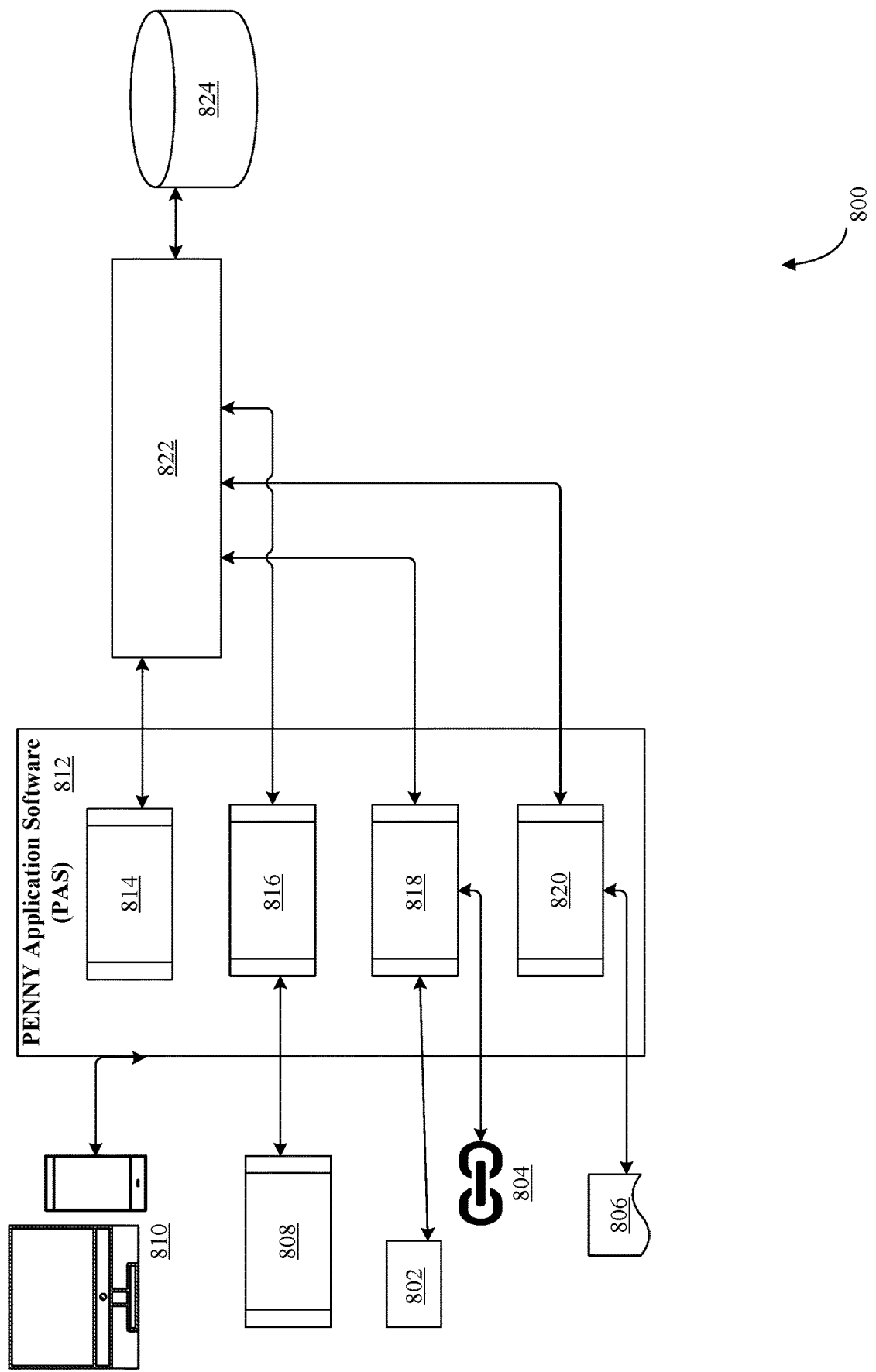
FIG. 8 depicts another exemplary system architecture for facilitating micropayments between distributed, independent consumers and content creators.

FIG. 8 depicts another exemplary system architecture for facilitating micropayments between distributed, independent consumers and content creators. FIG. 8 includes a generated QR Code 802, a generated Invoice Link 804, a report 806, a Payment Processors 808, a PENNY Web & Mobile Application 810, a PENNY Application Software (PAS) 812, a PENNY Account Framework 814, a PENNY Processing Framework 816, a PENNY Link Framework 818, a PENNY Analytics Framework 820, a PENNY Technology Interface Platform (PTIP) 822, and a PENNY accounts database 824.

As depicted in FIG. 8, the PENNY Web & Mobile Applications allow functionality for content consumers and creators to view their PENNY Wallet. The PENNY Account API functionality allows creation of various user accounts (content consumer, provider, and creator). The Mobile Application will allow scanning of sent generated QR Codes or Invoice Links.

The PENNY Link Framework will pass through full payment invoices, and will generate multiple pay invoices every time a new tip is being sent by a different user. This will allow functionality past default Lightening Network invoice and pay processes. Functionality such as being able to tip multiple times will be a unique PENNY feature. The framework will also include resources for user interface developers to easily create a PennyPay button for their application. The mobile application will allow sharing of codes through phones or other social collaboration sites or tools.

The PENNY Processing Framework may be the services API which will support tipping transactions between various wallets. The PENNY Analytics Framework leverages what may recorded in the blockchain to gain useful insights. This may be useful for providers to understand what content has high value and is worth investing into.

Figure 9:
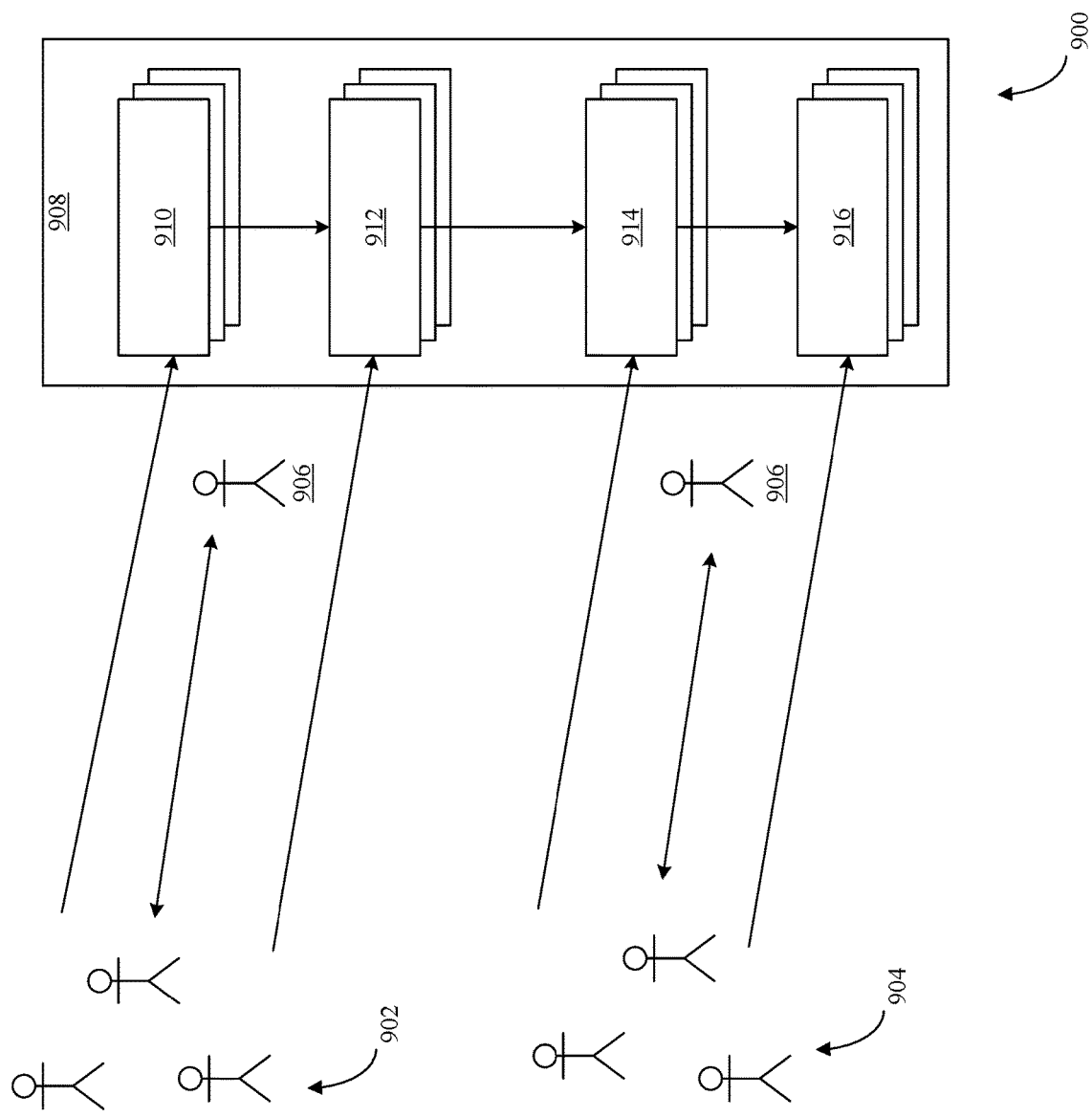
FIG. 9 depicts an exemplary process for opening and closing channels between distributed, independent consumers and content creators.

FIG. 9 depicts an exemplary process for opening and closing channels between distributed, independent consumers and content creators. FIG. 9 includes content consumers 902, content creators 904, PennyPay 906, a blockchain ledger 908, a ledger entry representing Starting balances of consumers and penny pay 910, a ledger entry representing Ending balances of consumer(s) and PennyPay 912, a ledger entry representing Starting balances of creators and penny pay 914, and a ledger entry representing Ending balances of creators and PennyPay 916.

An example flow of tips as depicted in FIG. 9 may include: Open payment channel, Create funding transaction, Commit transaction recorded. There may be multiple transactions to exchange funds (could be many tips over a course of a month to many creators from many consumers). A final redemption of agreements may be recorded. A similar process may occur for creators, however, PennyPay may requests creator invoice for distribution of aggregated content consumer funds.

The opening and closing of channels between parties is what is recorded to the bitcoin blockchain ledger. The starting and ending balances of Content Creator and PennyPay are recorded along with their public key. All the transactions that related to PennyPay can be tracked and correlated with content consumers.

When all the funds are aggregated from content consumers, PennyPay will request an invoice from the Content Creator. This transaction will also be recorded on the ledger and PennyPay can correlate this transaction.

End to end transactions moving from Content Consumer to PennyPay to Content Creator can be correlated. This will allow the capability to provide insights that can be used for marketing sense. Reports and tools will be created to inspect the ledger transactions and verify trends that can be used to determine things such as tipping propensity or content that is favorable in the market.

Figure 10:
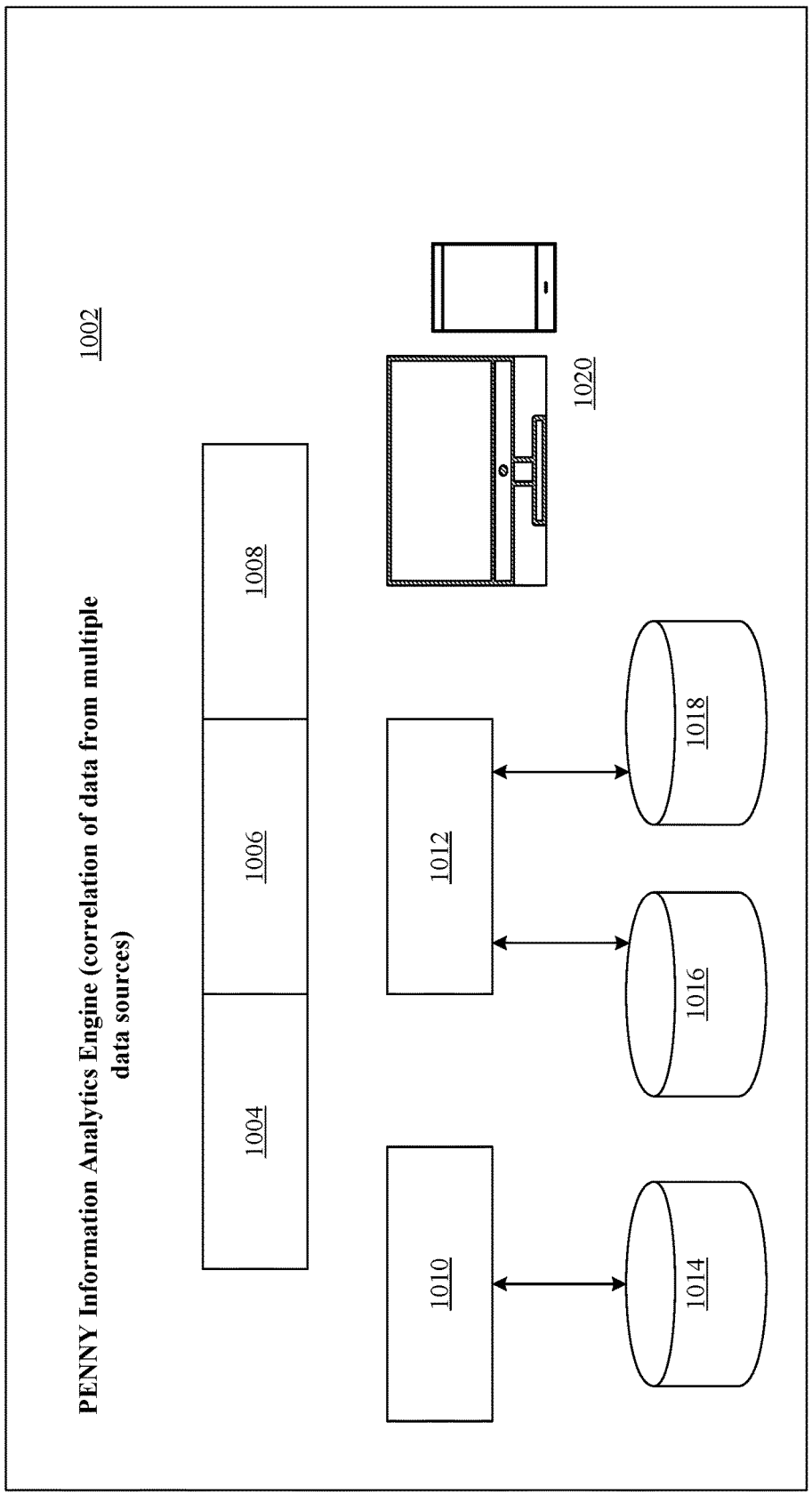
FIG. 10 depicts an exemplary analytics engine for correlation of data from multiple data sources.

FIG. 10 depicts an exemplary analytics engine for correlation of data from multiple data sources. FIG. 10 includes a PENNY Information Analytics Engine (PIAE) 1002, a PENNY Processing API 1004, a PENNY Wallet Services API 1006, a PENNY Link Services API 1008, a PENNY Account API 1010, a PENNY Analytics Tools & Services API 1012, a PENNY user data database 1014, a PENNY payment data database 1016, a ledger PENNY transactions database 1018, and a PENNY Web & Mobile Application 1020. Usage reports and trend reports may be generated by the APIs and services depicted in the figure.

PENNY Analytics Tools & Services in conjunction with account information, payment processing, wallets, and link generation will provide the base of the PENNY Information Analytics Engine (PIAE).

PIAE with native mobile functionality can lead to advanced tipping behavior discovery to find what content is valued. Mobile functionality along with other sources of PIAE data can be used with each other to find correlated significance for robust prediction modeling.

Data that can be gathered from mobile devices if enabled may track geolocation, weather, device type, device category, as well as other data types listed herein. QR codes and links for invoices can be generated and shared natively between apps (such as email, text, Facebook Messenger, Slack, Whatsapp, Wechat, or any other type of social exchange. Camera and link functionality can be leveraged to capture QR codes for invoices to process payment. Other data can be classified and captured such as transaction time, application usage patterns, user demographics, content category and data, website category and data, tip amounts, and other currency types can all be leveraged for unique insights.

Example insights would be gathered and culminated to answer questions. Does tipping behavior increases when sunny versus cloudy? Where are the best tippers in the world? What kinds of phones do people have and does this factor into different tipping behavior? Do certain web sites or content creators generate more or less tips? What social platform do people tip the most and why?

Figure 11:
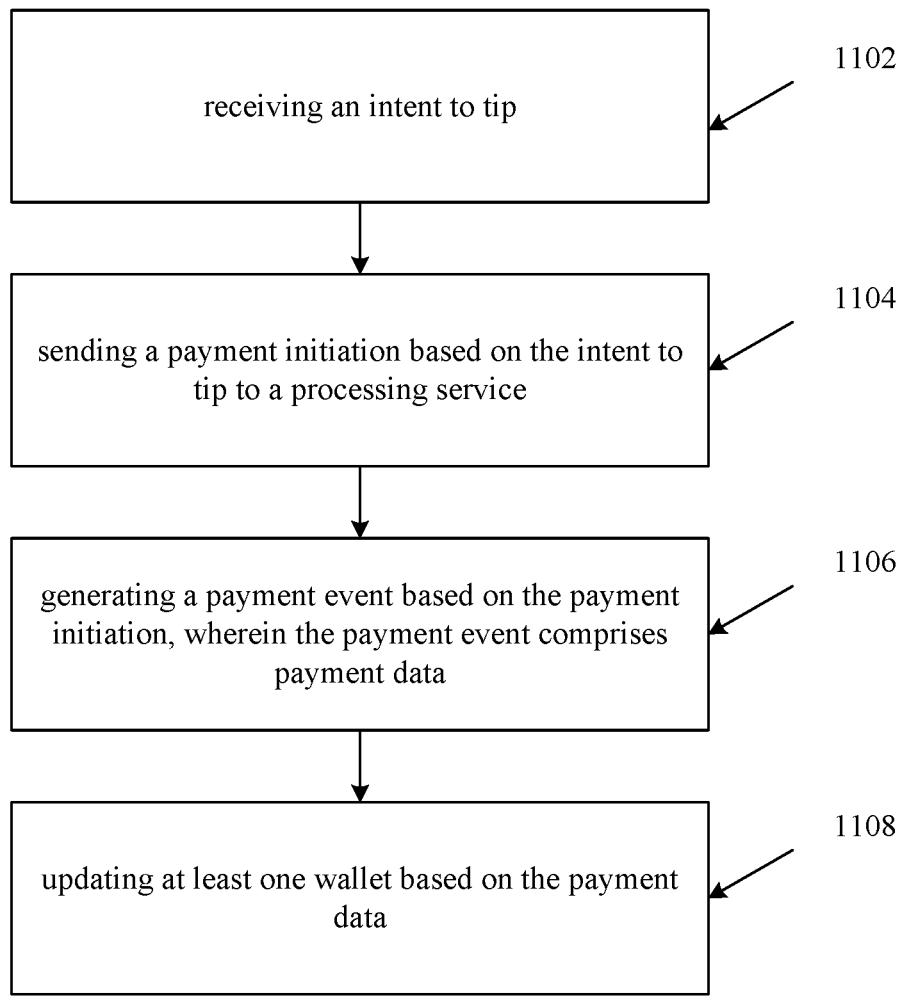
FIG. 11 depicts an exemplary method for facilitating micropayments between distributed, independent consumers and content creators.

FIG. 11 depicts an exemplary method 1100 for facilitating micropayments between distributed, independent consumers and content creators. The computer-implemented method 1100 may be related to enabling tips between at least one content consumer and at least one content creator. User interactions described in the computer-implemented method 1100 may be done through the use of a variety of human computer interfaces, such as mobile phones, tablets, phablets, wearable devices, as well as VR/AR devices and other devices/techniques described herein. Similarly, the method 1100 may utilize any of the systems and components disclosed in FIGS. 1-10.

The method 1100 may comprise receiving, at a web application from a user interface, an intent to tip (block 1102); sending, via the web application, a payment initiation based on the intent to tip to a processing service (block 1104); generating, at the processing service, a payment event based on the payment initiation, wherein the payment event comprises payment data (block 1106); and updating, at the processing service, at least one wallet based on the payment data (block 1108).

In some embodiments of the computer-implemented method 1100, receiving an intent to tip, may comprise creating, at the user interface, the intent to tip based on the content consumer interacting with the user interface. Similarly, in some embodiments, sending the payment initiation, further comprises validating, at the processing service, the payment initiation by performing, at the processing service, a status check on an account associated with the content consumer.

In some embodiments of the computer-implemented method 1100, generating the payment event, may comprise verifying, at the processing service, a balance for an account associated with the content consumer; and converting, at the processing service, a fiat currency to an equivalent in digital currency, and/or cryptocurrency.

In some embodiments of the computer-implemented method 1100, updating at least one wallet, may comprise updating at least one wallet associated with the content consumer, content creator, website host, an additional third party, or some combination thereof. The updating may be done by the processing service, or another component utilized by the method.

Some embodiments of the computer-implemented method 1100 may comprise updating, via the processing service and web application, the user interface based on the payment data. The update may be displayed to a user through their device, and/or the user may receive a notification of the update.

In some embodiments of the computer-implemented method 1100 may comprise transmitting, via the processing service to an interface platform, the payment data for analysis. Similarly, some embodiments of the computer-implemented method 1100 may comprise analyzing, at an analytics component, the payment data to generate tip data; and transmitting, via the analytics component to a content provider, the tip data.

Some examples of data that may be analyzed by the analytics component include: the time of a transaction (e.g. time of a tip), geolocation data for a tipper, weather data collected by a device used to send the tip, the device type, specific device data that may be used to identify the device, application data collected from the application used to provide the tip, user demographic data, content category, ie, the type of content that was tipped, data about the content, the type of website, the website name, data about the website, the tip amount, the type of cryptocurrency used to provide the tip, the starting and ending balance for the tipper and the tippee, the user providing the tip, ie, the tipper, and the account receiving the tip, ie, the tippee, and any type of relationship that may exist between tipper and tippee, e.g. connected on a social media network where tip is originating, prior tipper/tippee relationship data, previous tip data between the parties if it exists, and data related to time of tipping in relation to posting of content. These datasets may be collected and stored by the PENNY Micropayments Solution system for further analysis, and may be utilized to improve the user experience of the system.

In another embodiment, a tangible machine-readable medium comprising instructions for enabling tips between at least one content consumer and at least one content creator is disclosed. The instructions when executed, may cause a machine to at least: receive an intent to tip; send a payment initiation based on the intent to tip to a processing service; generate a payment event based on the payment initiation, wherein the payment event comprises payment data; and update at least one wallet based on the payment data. The instructions may include additional, less, or alternate functionality, including that discussed elsewhere herein. Similarly, the tangible machine-readable medium comprising instructions may cause any of the systems and components disclosed in FIGS. 1-10 to function according to the instructions.

In yet another embodiment, a system for enabling tips between at least one content consumer and at least one content creator is disclosed. The system may comprise a web application; a user interface; a processing service; and the system may be configured to at least: receive, at the web application from the user interface, an intent to tip; send, via the web application, a payment initiation based on the intent to tip to the processing service; generate, at the processing service, a payment event based on the payment initiation, wherein the payment event comprises payment data; and update, at the processing service, at least one wallet based on the payment data. The system may include additional, less, or alternate functionality, including that discussed elsewhere herein. Similarly, the system may utilize any of the systems and components disclosed in FIGS. 1-10.

The methods and systems discussed herein may be implemented via one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

The server(s), client computing platform(s), and any other discussed third parties may be communicatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s), client computing platform(s), and any other discussed third parties may be operatively linked via some other communication media.

A given client computing platform may include one or more processors configured to execute computer program modules. The computer program modules may be configured to enable a user associated with the given client computing platform to interface with the described systems and methods and/or provide other functionality attributed herein to client computing platform(s). By way of non-limiting example, the given client computing platform may include one or more of a desktop computer, a laptop computer, a handheld computer, a tablet computing platform, a Smartphone, a gaming console, a VR/AR headset or other device, and/or other computing platforms.

Server(s) may include electronic storage and one or more processors, and/or other components. Server(s) may include communication lines, or ports to enable the exchange of information with a Network and/or other computing platforms. Illustration of server(s) is not intended to be limiting. Server(s) may include a plurality of hardware, software, and/or firmware components operating together to provide the functionality attributed herein to server(s). For example, server(s) may be implemented by a cloud of computing platforms operating together as server(s).

The electronic storage may comprise non-transitory storage media that electronically stores information. The electronic storage media may include one or both of system storage that is provided integrally (i.e., substantially non-removable) with server(s) and/or removable storage that is removably connectable to server(s) via, for example, a port (e.g., a USB port, a firewire port, etc.) or a drive (e.g., a disk drive, etc.). The electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private Network, and/or other virtual storage resources). The electronic storage may store software algorithms, information determined by processor(s), information received from server(s), information received from client computing platform(s), databases and/or other information that enables server(s) to function as described herein.

Processor(s) may be configured to provide information processing capabilities in server(s). As such, processor(s) may include one or more of a digital processors, an analog processor, a digital circuit designed to process information, an analog circuit designed to process information, a state machine, and/or other mechanisms for electronically processing information. Although processor(s) may function as a single entity, in other implementations, processor(s) may include a plurality of processing units. These processing units may be physically located within the same device, or processor(s) may represent processing functionality of a plurality of devices operating in coordination. Processor(s) may be configured to execute instructions for applications, or modules, by software; hardware; firmware; some combination of software, hardware, and/or firmware; and/or other mechanisms for configuring processing capabilities on processor(s). As used herein, the term "module" may refer to any component or set of components that perform the functionality attributed to the module. This may include one or more physical processors during execution of processor readable instructions, the processor readable instructions, circuitry, hardware, storage media, or any other components.

The various messaging and data transfer described above can be accomplished with a REST API (or "RESTful" API). A RESTful API is an application program interface (API) that uses HTTP calls to request resources as opposed to functions. The function is embedded in the HTTP call through requests to GET, PUT, POST and DELETE, for example. The API spells out the proper way to request data, from an operating system or other application and allows management of customer data, sales orders, inventory, and products. This entire process can be open-sourced to the general public through permissioned API endpoints and PGP keys for encryption of data transmission in a single package as an SDK.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The description presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

We claim:

1. A computer-implemented method related to enabling tips between at least one content consumer and at least one content creator, comprising:
   creating or identifying a second network channel wallet associated with the at least one content creator;
   causing, using a web application, a tipping icon to be presented via a content channel, wherein the tipping icon is associated with content presented via the content channel, and wherein the content is associated with the at least one content creator;
   causing, in response to engagement of the tipping icon and via the web application, output of one or more tipping options, each of the tipping options indicative of an amount from $0.01 to $3.00 including endpoints;
   receiving, in response to selection of a select tipping option of the one or more tipping options, an indication of an intent to tip by a user, wherein the indication of the intent to tip comprises a micro-tipping tip amount, and wherein the tip amount is a micro-tipping amount from $0.01 to $3.00 including endpoints;
   creating or identifying, in response to the indication of the intent to tip by the user, a first network channel wallet associated with the user,
      wherein each of the first network channel wallet and the second network channel wallet is registered to the content channel and is able to transact on a layer two network of a blockchain network implementing a cryptocurrency protocol capable of transactions of 1 satoshi (0.00000001 BTC),
      wherein each of the first network channel wallet and the second network channel wallet is hosted by a centralized interface platform, the first network channel wallet is registered to a respective content consumer account associated with the interface platform, and the second network channel wallet is registered to a respective content creator account associated with the interface platform,
      wherein each of the content consumer and the content creator accounts comprises user data accessible to the interface platform to authenticate the user and the association between the accounts and the respective network channel wallets,
      wherein the centralized interface platform interfaces between the content consumer and the content creator accounts and the respective first and second network channel wallet to facilitate interactions between the content consumer and the content creator via content channel, while allowing the centralized interface platform to manage any interactions between the first network channel wallet and second network channel wallet via the blockchain network on behalf of the content consumer and the content creator;
   causing, via the centralized interface platform and in response to the indication of the intent to tip by the user, funding of the first network channel wallet with the micro-tipping amount from a user crypto wallet;
   causing, by the centralized interface platform, on behalf of the content consumer, and via the layer two network, a transaction that represents a transfer of the micro-tipping amount from the first network channel wallet to the second network channel wallet;
   updating, via the centralized interface platform and based on the transaction, at least one of the first network channel wallet or the second network channel wallet to reflect the transaction, including additional information related to the transaction and the content consumer; and
   upon exceeding a settlement threshold, automatically causing a transaction that represents a transfer of all funds in the second network channel wallet to a plurality of settlement crypto wallets, wherein the plurality of settlement crypto wallets comprise at least a content creator settlement wallet associated with the content creator, a web hosting wallet associated with a host of the web application, and an administrative wallet, and wherein the transfer of all funds in the second network channel wallet to a plurality of settlement crypto wallets is based on a rule set that indicates an allocation percentage of each of the plurality of settlement crypto wallets.

2. The computer-implemented method of claim 1, wherein the content channel comprises a website.

3. The computer-implemented method of claim 1, wherein the settlement threshold is a time limit.

4. The computer-implemented method of claim 1, wherein the settlement threshold is an amount of funds.

5. The computer-implemented method of claim 1, wherein the rule set comprises a computer-executable smart contract.

6. A computer-implemented method related to enabling tips between at least one content consumer and at least one content creator, comprising:
   creating or identifying a second network channel wallet associated with the at least one content creator;
   causing, using a web application, a tipping icon to be presented via a content channel, wherein the tipping icon is associated with the at least one content creator;
   receiving, in response to engagement of the tipping icon and via the web application, an indication of an intent to tip by a user, wherein the indication of the intent to tip comprises a tip amount, and wherein the tip amount is a micro-tipping amount from $0.01 to $3.00 including endpoints;
   creating or identifying, in response to the indication of the intent to tip by the user, a first network channel wallet associated with the user, wherein each of the first network channel wallet and the second network channel wallet is registered to the content channel and is able to transact on a layer two network of a blockchain network implementing a cryptocurrency protocol capable of transactions of 1 satoshi (0.00000001 BTC), wherein each of the first network channel wallet and the second network channel wallet is hosted by a centralized interface platform, the first network channel wallet is registered to a respective content consumer account associated with the interface platform, and the second network channel wallet is registered to a respective content creator account associated with the interface platform, wherein each of the content consumer and the content creator accounts comprises user data accessible to the interface platform to authenticate the user and the association between the accounts and the respective network channel wallets, wherein the centralized interface platform interfaces between the content consumer and the content creator accounts and the respective first and second network channel wallet to facilitate interactions between the content consumer and the content creator via content channel, while allowing the centralized interface platform to manage any interactions between the first network channel wallet and second network channel wallet via the blockchain network on behalf of the content consumer and the content creator;

causing, via the centralized interface platform and in response to the indication of the intent to tip by the user, funding of the first network channel wallet with the micro-tipping amount from a user crypto wallet;

causing, by the centralized interface platform, on behalf of the content consumer, and via the layer two network, a transaction that represents a transfer of the micro-tipping amount from the first network channel wallet to the second network channel wallet; and updating, based on the transaction, at least one of the first network channel wallet or the second network channel wallet to reflect the transaction, including additional information related to the transaction.

7. The computer-implemented method of claim 6, further comprising: upon exceeding a settlement threshold, causing a transaction that represents a transfer of all funds in the second network channel wallet to a plurality of settlement crypto wallets, wherein the plurality of settlement crypto wallets comprise at least a content creator settlement wallet associated with the content creator, a web hosting wallet associated with a host of the web application, and an administrative wallet, and wherein the transfer of all funds in the second network channel wallet to a plurality of settlement crypto wallets is based on a rule set that indicates an allocation percentage of each of the plurality of settlement crypto wallets.

8. The computer-implemented method of claim 6, wherein the content channel comprises a website.

9. The computer-implemented method of claim 7, wherein the settlement threshold is a time limit.

10. The computer-implemented method of claim 7, wherein the settlement threshold is an amount of funds.

11. The computer-implemented method of claim 7, wherein the rule set comprises a computer-executable smart contract.

* * * * *